July 30, 1957  A. G. THORP II  2,801,071
BLADED ROTOR CONSTRUCTION
Filed Jan. 31, 1952  3 Sheets-Sheet 2
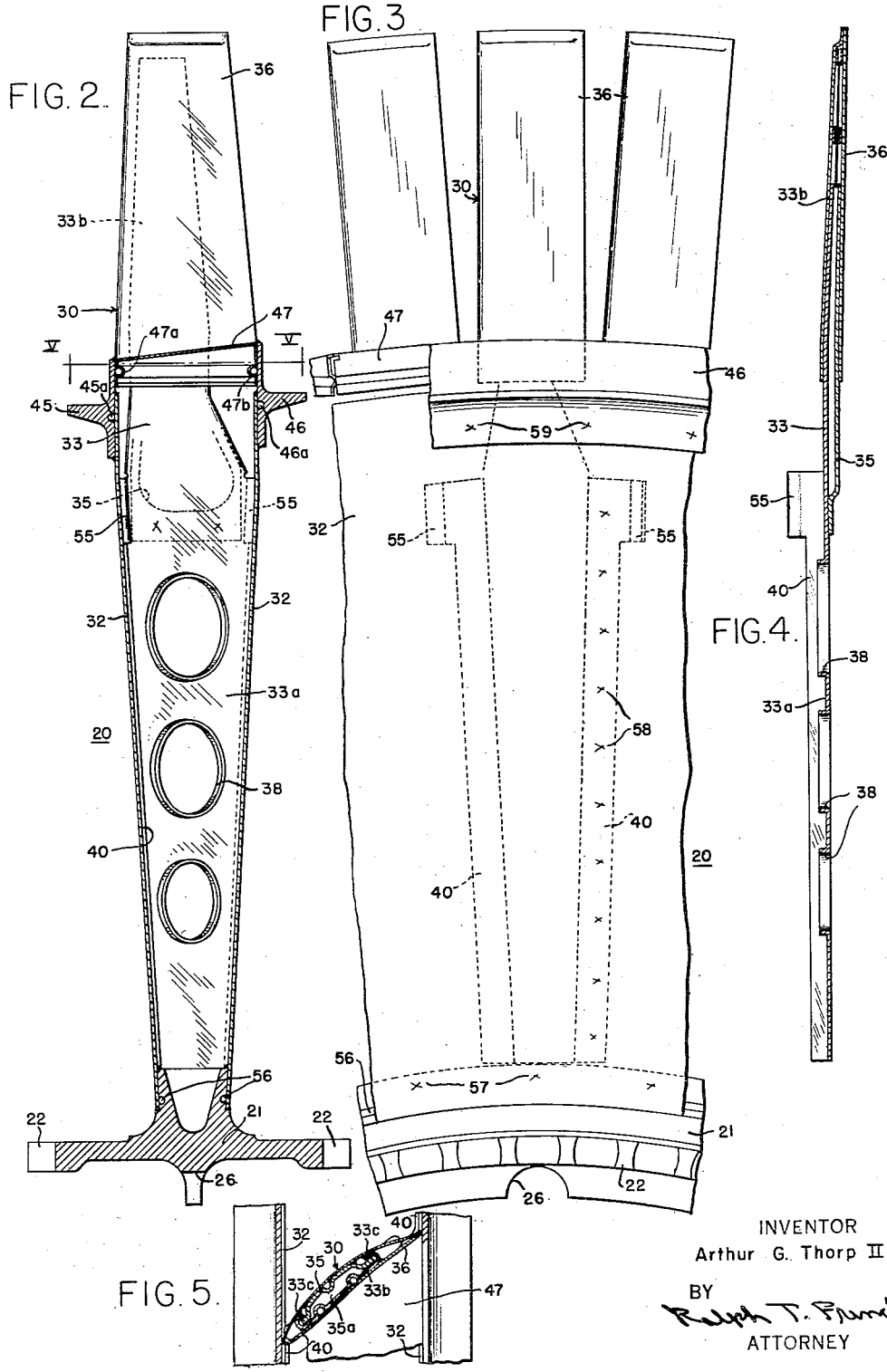
INVENTOR
Arthur G. Thorp II
BY
ATTORNEY

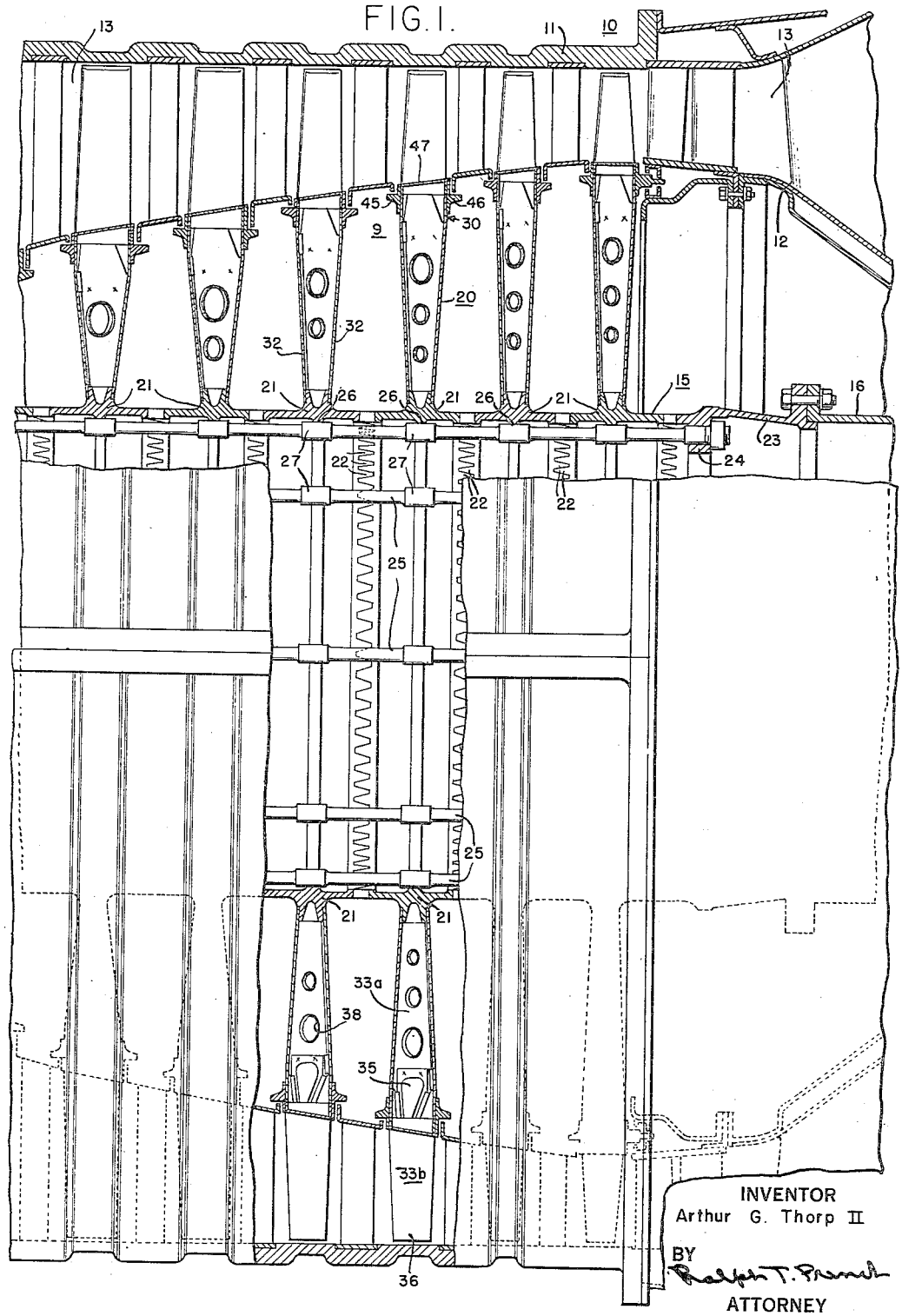
FIG. I.
INVENTOR
Arthur G. Thorp II
BY
ATTORNEY

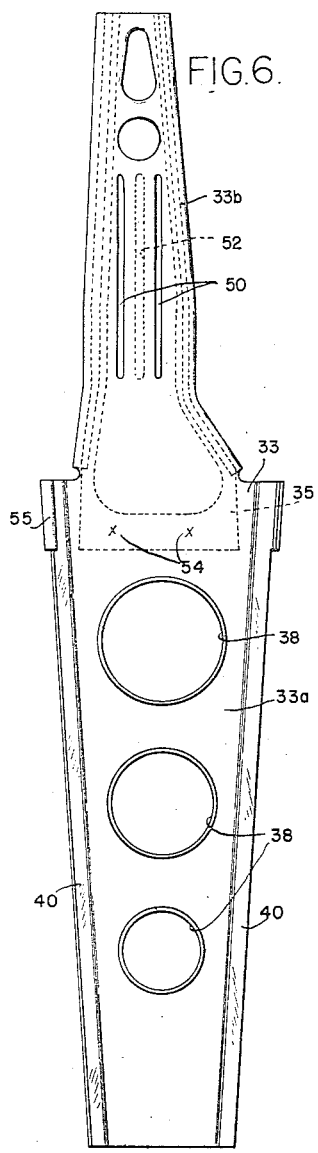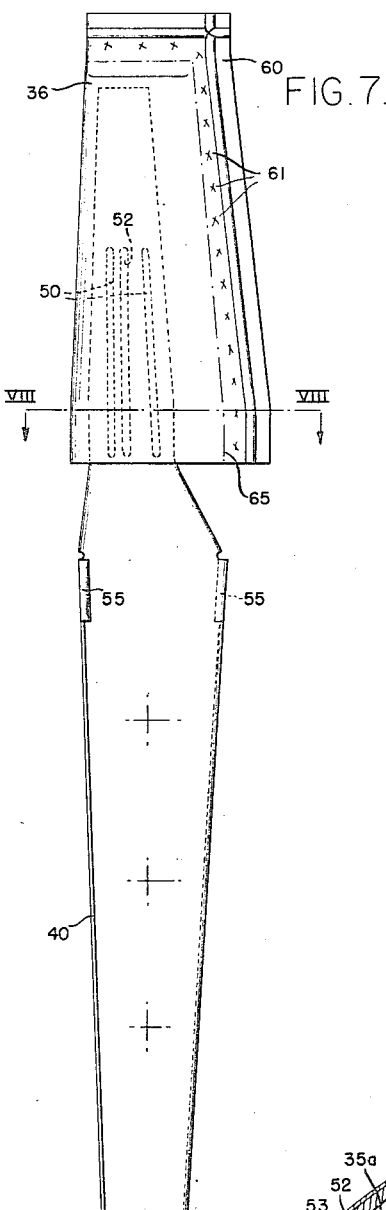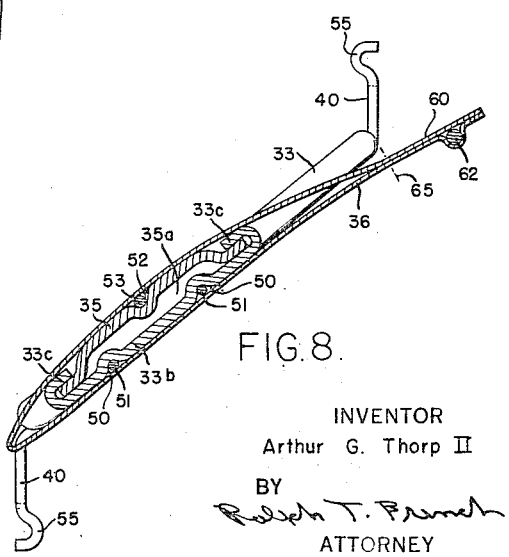

United States Patent Office 2,801,071
Patented July 30, 1957

2,801,071

BLADED ROTOR CONSTRUCTION

Arthur G. Thorp II, Swarthmore, Pa., assignor to Westinghouse Electric Corporation, East Pittsburgh, Pa., a corporation of Pennsylvania Application January 31, 1952, Serial No. 269,300

5 Claims. (Cl. 253—39)

This invention relates to gas turbine power plants, and more particularly, to blade and rotor assemblies for axial-flow compressors for use in such power plants.

It has been the practice of manufacturers of gas turbine power plants, such as aviation turbojets, to use machined compressor and turbine discs for carrying the conventional solid blades of current design. It has more recently been proposed to employ fabricated or hollow blades, to lighten the weight of a gas turbine engine. With the development of satisfactory hollow blades, it becomes feasible to use much lighter discs to carry the load of these blades. In an attempt to produce extremely light forged discs, however, the designer may be confronted with manufacturing difficulties proving thin solid forgings to be unacceptable for practical purposes. It is an object of the present invention to provide an improved disc assembly having major portions fabricated from sheet metal, with consequent savings in weight and cost.

Another object of the invention is to provide an improved rotor blade and disc assembly offering maximum lateral rigidity for resisting bending and vibration.

A further object is the provision of a lightweight rotor assembly having major components formed of sheet metal, including fabricated hollow blades having stamped sections with integral shank portions which are secured to self-centering annular interlocking body members, the shank portions being interposed between annular plates to constitute discs to support the blades, and the annular members being clamped together by a series of studs engaging only the inner edges thereof and having screw-threaded ends secured to suitable end members that are disposed at opposite ends of the rotor assembly.

A further object of the invention is to provide a fabricated disc and blade assembly comprising a minimum number of components which are adapted to be readily assembled and secured together through the facility of economical brazing techniques.

These and other objects are effected by the invention as will be apparent from the following description and claims taken in connection with the accompanying drawings, forming a part of this application, in which:

Fig. 1 is a fragmentary longitudinal, largely sectional, view of the compressor portion of an aviation gas turbine engine, illustrating axial-flow compressor blade and disc assemblies constructed in accordance with the invention;

Fig. 2 is an enlarged detail fragmentary sectional view of one of the blade and disc assemblies forming part of one stage of the compressor shown in Fig. 1;

Fig. 3 is a fragmentary plan view of the same blade and disc assembly;

Fig. 4 is a fragmentary side sectional view of one of the blade assemblies, such as that of Fig. 2 but prior to installation thereof in a complete blade and disc assembly;

Fig. 5 is a sectional view taken substantially along the line V—V of Fig. 2;

Fig. 6 is a plan view of the partially completed blade assembly shown in section in Fig. 4;

Fig. 7 is a plan view similar to Fig. 2 but illustrating a blade assembly like that of Fig. 6 following a further step in the process of manufacture; and Fig. 8 is an enlarged detail sectional view taken substantially along the line VIII—VIII of Fig. 7.

Referring to the drawings, an axial-flow compressor 9 of a typical aviation gas turbine engine 10 is illustrated in Fig. 1. The construction of a power plant of this type is well known, and may comprise a tubular outer casing 11 along the axis of which is mounted a core structure, indicated generally at 12, to provide a substantially continuous annular passageway 13, which extends from a forward air intake to a rearwardly disposed nozzle (neither shown in the drawings). In addition to the compressor 9, other engine components, not illustrated, may include suitable combustion apparatus and a turbine, which drives the rotor 15 of the compressor 9 through the medium of a hollow shaft 16. It will be understood that, in operation, air entering the frontal intake of the engine is delivered under pressure from the compressor 9 to the combustion apparatus, where fuel is burned to form hot motivating gases. Sufficient energy is extracted from these gases during expansion through the turbine for driving the compressor 9. Gases exhausting from the turbine are then discharged by way of the nozzle for establishing a propulsive thrust.

The rotor 15 of the compressor 9 has a number of stages and comprises an assembly of fabricated disc units of graduated sizes, one of which is indicated by the reference character 20 and will presently be more fully described as representative of the others. Each of these disc units includes an annular central section 21 having oppositely disposed clutch teeth 22 formed thereon and adapted for interlocking engagement with the complementary teeth of the central sections of adjacent disc units. The section 21 of the disc unit nearest the discharge end of the compressor rotor is interlocked with a bridging section 23 that is bolted to the tubular shaft 16. Another bridging section (not shown) disposed at the opposite or inlet end of the rotor 15 has a suitable bolting flange aligned with a flange 24 of the bridging section 23, said flanges being apertured for receiving the opposite ends of a plurality of elongated studs 25, by means of which the disc units of the rotor 15 are clamped together. The studs 25 are thus disposed interiorly of the assembled disc units including disc unit 20, each of the central sections 21 having spaced grooves or arcuate surfaces 26 formed thereon for engagement with collar portions 27 of the respective studs.

According to the invention, the disc unit 20, a fragmentary section of which is illustrated in Fig. 2 as representative of the number of disc units from which the compressor rotor 9 of Fig. 1 is assembled, comprises a number of circumferentially spaced, fabricated sheet metal blade assemblies 30, which extend radially from the associated central section 21 and have shank portions interposed between a pair of annular plates 32. Each blade assembly 30 includes an elongated body section 33 having integral shank and blade portions 33a and 33b, and a reinforcing or damping section 35, which is interlocked with and brazed to the blade portion 33a for supporting an enveloping blade sheath 36. As best shown in Figs. 4 and 6, openings defined by annular stiffening flanges 38 are formed in the shank portion 33a of the body section 33. Oppositely inclined longitudinal flanges 40 are formed along the lateral edges of the shank portion 33a, as best shown in Figs. 6 and 8. Each of these flanges 40 is adapted to be welded and brazed to one of the annular plates 32, as indicated in Fig. 3, thereby to hold the blade assembly in a suitably canted position relative to the rotor axis, as best shown in Fig. 5. This figure, as well as Fig. 8, also illustrates the overlapping and clamped assembly of the interlocking blade portion 33b of body section 33 with the damping section 35. It will be noted that marginal flanges 33c of the body section are folded over the lateral edges of the damping section 35, and that the latter is somewhat bowed to leave a longitudinal space 35a between the intermediate inner faces of said sections. At these points, a suitable dry lubricant may be introduced between the faying surfaces, which are adapted to slide relatively to an extent serving to damp vibrations of the blade.

The assembled disc unit 20 further comprises oppositely disposed annular seal elements 45 and 46 (see Fig. 2), which are adapted to be welded and brazed at 45a and 46a to the respective plates 32 in the manner hereinafter described. Between the separate blade assemblies 30, spacers or segments 47 are disposed in circumferential alignment, each spacer having flanges brazed at 47a and 47b to adjacent surfaces of the respective seal elements 45 and 46, and to the blade sheath 36.

In fabricating one of the improved blade assemblies in accordance with the invention, as best illustrated in Figs. 5 to 8, inclusive, the elongated body section 33 is locally crimped to provide longitudinal channels 50 adapted to receive brazing material 51, such as a brazing wire (see Fig. 8). The reinforcing section 35 is similarly provided with a channel 52 for holding a brazing wire 53. Spot welding is employed at points 54, shown in Fig. 6, for initially holding the elements together prior to brazing. The flanges 40 are likewise provided with terminal channel portions 55 for receiving brazing wires to facilitate brazing thereof to the side plates 32, shown in Fig. 2. Annular brazing wires 56 are applied to suitable grooves in the central section 21 for facilitating brazing thereto of the inner edges of the annular plates 32. As shown in Fig. 3, spot welding may also be utilized at points 57 for holding the latter parts together, at points such as those indicated at 58 for initially holding the flanges 40 in contact with the plates 32, and at points 59 between the plates and the seal elements 45—46, prior to subjection of the disc assembly to the brazing process.

The blade sheath 36 is folded or formed to provide an airfoil cross-section, as shown in Fig. 8, the portions constituting the tip and trailing edges being initially pressed together to provide an excess marginal portion, indicated by the reference character 60 in Figs. 7 and 8. This marginal portion is welded at points 61, and is suitably crimped to receive brazing wire material 62. With the sheath 36 then mounted on the interlocked blade sections 35 and 33, the assembly is ready for completion of the brazing process.

It will be understood that when brazing heat is applied to the disc assembly, the brazing material will be spread uniformly between the various surfaces to be joined together, as just described. Following brazing, trimming of each sheath 36 at the line 65 will leave a properly proportioned blade structure.

From the foregoing it will now be apparent that, according to the invention, the relatively light sheet metal sections are adapted to be arranged and brazed together to provide a sturdy disc structure which can be substituted for the much heavier, and in some respects weaker, bladed discs of solid construction heretofore employed. By providing elongated radially arranged blade sections, including the integral shank portions 33a, which are carried by the annular central section 21, adequate rigidity of the structure is ensured. The disclosed method of assembling, welding and brazing the disc assembly may readily be accomplished in accordance with economical mass production techniques, thus rendering available a new and improved compressor rotor assembly exhibiting both favorable strength and weight characteristics, and desirably low production costs.

While the invention has been shown in but one form, it will be obvious to those skilled in the art that it is not so limited, but is susceptible of various changes and modifications without departing from the spirit thereof.

What is claimed is:

1. A fabricated bladed component for a multi-stage axial-flow elastic fluid-utilizing rotor, comprising an integral annular central section having lateral clutch teeth for engagement with corresponding portions of adjacent components of the rotor, a plurality of radially disposed blade sections each including an elongated shank portion secured to the central section and an integral blade portion, an airfoil contoured blade sheath secured to each of said blade portions, and annular plates carried on opposite sides of said shank portions, said plates having their outer peripheral edges disposed adjacent the junctions of said blade portions and said shank portions and being rigidly connected to said shank portions.

2. A fabricated sheet metal blade assembly for an elastic fluid-utilizing rotor component, comprising an element having integral shank and blade portions, a damping element of substantially the length of said blade portion and interlocked with said blade portion, said blade portion having flanges overlapping and gripping said damping element, a blade sheath having an airfoil cross-section enveloping said interlocked blade portion and damping element, and means for securing said elements together to provide a unitary structure.

3. A fabricated sheet metal blade assembly for an elastic fluid-utilizing rotor component, comprising an element having integral shank and blade portions, a damping element of substantially the length of said blade portion and interlocked with said blade portion, said blade portion having flanges overlapping and gripping said damping element, a blade sheath having an airfoil cross-section enveloping said interlocked blade portion and damping element, means for securing said elements together to provide a unitary structure, and a lubricant disposed between engaging surfaces of said blade portions and said damping element for facilitating a limited degree of sliding between such surfaces, whereby said assembly serves to damp blade vibrations.

4. A fabricated bladed component for a multi-stage axial-flow elastic fluid-utilizing rotor, comprising an integral annular central section having lateral clutch teeth for engagement with corresponding portions of adjacent components of the rotor, said central section having an annular peripheral flange having side surfaces substantially normal to the rotor axis, a plurality of radially disposed blade sections each including an elongated shank portion and an integral blade portion, a plurality of reinforcing blade sections interlocked with said blade portions, respectively, a plurality of blade sheaths enveloping and secured to the pairs of interlocked blade and reinforcing sections, respectively, annular side plates secured to opposite edges of said shank portions of the blade sections, respectively, the peripheral edges of said side plates being disposed substantially adjacent the juncture of said shank and blade portions of the respective blade sections, and means securing inner marginal areas of said side plates to said side surfaces of the flanges on said central section.

5. A fabricated bladed component for a multi-stage axial-flow elastic fluid-utilizing rotor, comprising an integral annular central section having lateral clutch teeth for engagement with corresponding portions of adjacent components of the rotor, said central section having an annular peripheral flange having side surfaces substantially normal to the rotor axis, a plurality of radially disposed blade sections each including an elongated shank portion and an integral blade portion, a plurality of reinforcing blade sections interlocked with said blade portions, respectively, a plurality of blade sheaths enveloping and secured to the pairs of interlocked blade and reinforcing sections, respectively, annular side plates secured to opposite edges of said shank portions of the blade sections, respectively, the peripheral edges of said side plates being disposed substantially adjacent the juncture of said shank and blade portions of the respective blade sections, means securing inner marginal areas of said side plates to said side surfaces of the flanges on said central section, and flanged spacers in circumferential alignment between said blade sections and adjacent said peripheral edges of the side plates.

References Cited in the file of this patent

UNITED STATES PATENTS

| | | |
|---|---|---|
| 1,530,249 | Eveleth | Mar. 17, 1925 |
| 2,427,614 | Meier | Sept. 16, 1947 |
| 2,432,185 | Watson | Dec. 9, 1947 |
| 2,458,149 | Cronstedt | Jan. 4, 1949 |
| 2,461,242 | Soderberg | Feb. 8, 1949 |
| 2,559,013 | Eastman et al. | July 3, 1951 |
| 2,621,018 | Barrett | Dec. 9, 1952 |

FOREIGN PATENTS

| | | |
|---|---|---|
| 595,643 | Great Britain | Dec. 11, 1947 |